(No Model.)
J. HEILRATH.
TWO WHEELED VEHICLE.
No. 424,648. Patented Apr. 1, 1890.
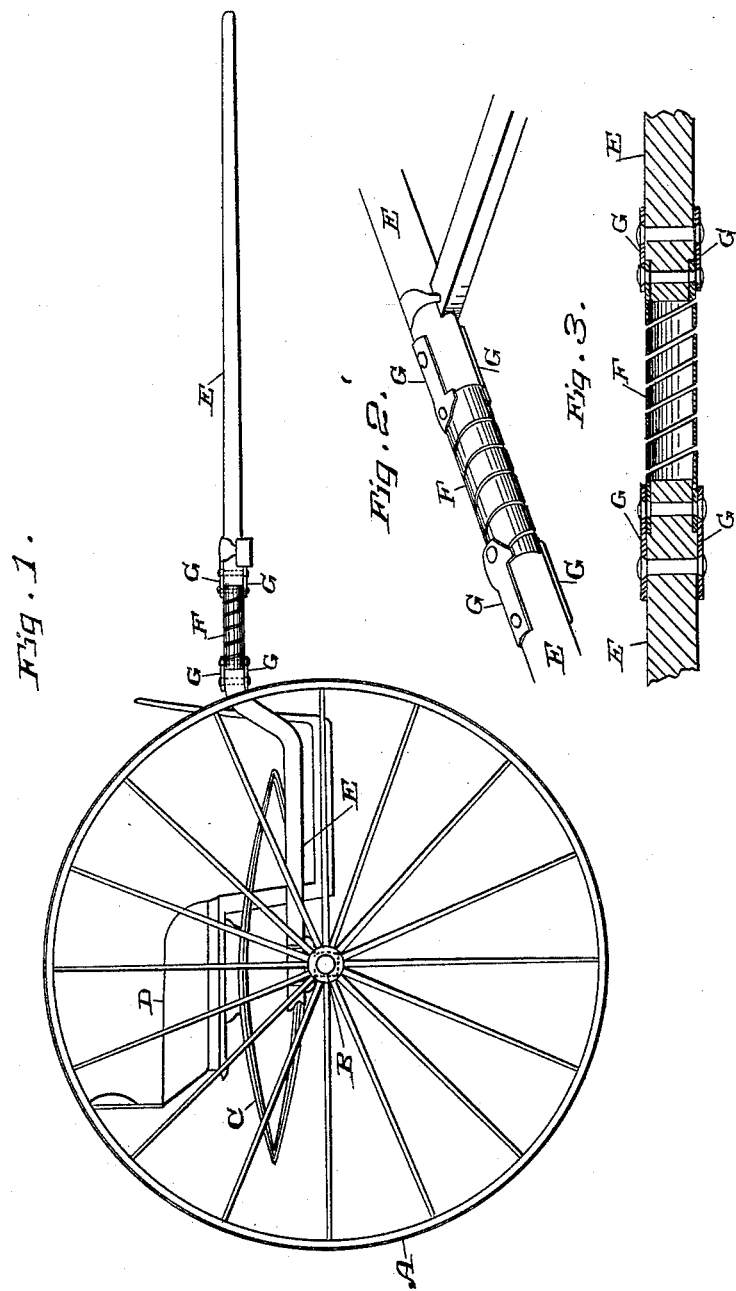
Witnesses:
Geo. H. Strong.
J. H. Nurse
Inventor
John Heilrath
By Dewey & Co.
Atty

UNITED STATES PATENT OFFICE.

JOHN HEILRATH, OF PLYMOUTH, CALIFORNIA.

TWO-WHEELED VEHICLE.

SPECIFICATION forming part of Letters Patent No. 424,648, dated April 1, 1890.

Application filed September 21, 1889. Serial No. 324,681. (No model.)

*To all whom it may concern:*

Be it known that I, JOHN HEILRATH, of Plymouth, Amador county, State of California, have invented an Improvement in Two-Wheeled Vehicles; and I hereby declare the following to be a full, clear, and exact description of the same.

My invention relates to that class of two-wheeled vehicles in which divided or jointed shafts are employed; and my invention consists in the novel spring-connection for the divided shaft hereinafter fully described, and specifically pointed out in the claims.

The object of my invention is to do away with that objectionable feature of this class of vehicles known as "horse motion" by providing for a sufficient independence between body and shafts, which will enable the latter to have their up and down and lateral movement freely, but without imparting any such movement to the body.

Referring to the accompanying drawings for a more complete explanation of my invention, Figure 1 is a side elevation of a two-wheeled vehicle provided with my divided shaft. Fig. 2 is a view of my shaft at the joint. Fig. 3 is a section of same.

A is the wheel, B the axle, C the spring, and D the body, of any ordinary cart.

E is the shaft, the rear end being secured or clipped solidly, as usual, to any suitable portion of the vehicle either to the body or portion thereof or to the axle, as the case may be. The shaft is divided into a forward section and a rear section, and the two sections are united by a coil-spring F. This spring fits well over the adjacent ends of the sections, and is secured to each in any suitable manner, as by the irons G, which hold it firmly. The spring is heavy enough for all purposes of connection, and yet sufficiently yielding to allow the forward section of the shaft to have its up and down and lateral movement freely, but without affecting the rear section, and consequently allowing the body to remain steady and free of any horse motion. The spring F is preferably made of flat spring-steel in the shape of a true coil and yields in every direction. Although it may be located at any point of the shaft, I prefer to place it back of the cross-bar to insure the avoidance of lateral motion.

I am aware of the employment of divided shafts in two-wheeled vehicles, and that the joint so made has necessarily been controlled by springs; but in such cases there is usually a distinct hinge which the spring controls. In my construction I need no hinge, the spring itself serving as both hinge and controlling-power.

Having thus described my invention, what I claim as new, and desire to secure by Letters Patent, is—

1. In a two-wheeled vehicle, the sectional or divided shaft thereof, in combination with the coil-spring connecting the shaft-sections, substantially as described.

2. In a two-wheeled vehicle, the sectional or divided shaft thereof, in combination with the coil-spring connecting the shaft-sections, the ends of said spring being fitted over and firmly secured to the adjacent ends of the sections, substantially as described.

3. In a two-wheeled vehicle, the sectional or divided shaft thereof, in combination with the coil-spring connecting the shaft-sections, the ends of said spring fitting over the adjacent ends of the sections, and the irons G, securing the spring ends to the sections, substantially as described.

In witness whereof I have hereunto set my hand.

JOHN HEILRATH.

Witnesses:
W. S. WESTON,
W. M. MCMILLIN.